July 7, 1925.

J. F. COOK, JR 1,545,129

AIRCRAFT STRUCTURE

Filed Sept. 27, 1923    4 Sheets-Sheet 4

Inventor:
John F. Cook Jr.
By
Attorneys

Patented July 7, 1925.

1,545,129

UNITED STATES PATENT OFFICE.

JOHN F. COOK, JR., OF DETROIT, MICHIGAN.

AIRCRAFT STRUCTURE.

Application filed September 27, 1923. Serial No. 665,111.

*To all whom it may concern:*

Be it known that I, JOHN F. COOK, Jr., a citizen of the United States of America, residing at Detroit, in the county of Wayne and State of Michigan, have invented certain new and useful Improvements in Aircraft Structures, of which the following is a specification, reference being had therein to the accompanying drawings.

This invention relates to a metallic truss system of construction which is especially designed with a view to its use in the fabrication of beams or spars and drag trussing for airplane wings.

The primary object of the invention is to provide a structural truss of metal which can be used either in externally or internally braced wings of high lift and where the maximum strength is secured with a minimum weight of material, the construction being especially adapted to quantity production.

A further object is to provide a truss, preferably of high strength alloy steel members, secured together by electric spot welding to avoid the use of rivets or wires, the truss having great stiffness against vertical and torsional deflection, while at the same time being more durable and not readily to be warped out of shape.

Another object is to provide a metallic truss in which the members comprising both the chords and the lattice web system are so tapered from panel to panel and so shaped, proportioned and united as to have at all points the minimum sectional area of metal required to carry safely the maximum stresses to which each part may be subjected.

Other and further objects will appear in connection with the description of the specific embodiments illustrated in the accompanying drawings, in which.

The metallic constructions herein illustrated are designed for use as supporting members for the aerofoil of the metallic construction described and claimed in my copending application, Serial No. 607,539, filed December 18, 1922. The method of attaching the wing ribs of the prior application to the spars of this construction is the same method as described in the former application.

In the present construction the truss consists of upper and lower open channel chord members 1, connected by a web formed of tubular members 2 and 3 of steel tubing, having the same chemical analysis as the chord members, the tubes being split and flattened at their ends to provide parallel flat end portions 4 on each end of each tube or web member to straddle the side flanges 5, of the chords, and the two flattened end parts are welded to the opposite faces of these flanges with the longitudinal axes of the tubular members in the planes of the flanges.

The compression strength of the open channel chord members 1 used in this construction depends on the resistance to crinkling of the metal, as the unsupported column length of the chord members is short in proportion to their cross section, and crinkling is reduced to a minimum by the use of liberal curves and by deep corrugations within the channels, as well as by the use of a small number of highly stressed supporting members, thus avoiding the use of thin gage material. Where only two or three spars are used to a wing as is intended in the present construction, the individual members will have a greater bulk so that the material will be less subject to crinkling and buckling.

In this construction where the chord members are in the form of a U-shaped channel, the gravity axis of each chord is near the closed side of the channel, and by placing the open sides facing each other, the gravity axes of the chord members will be at the maximum distance from the neutral axis of the spar, thus utilizing the material to the best advantage.

Figure 3:
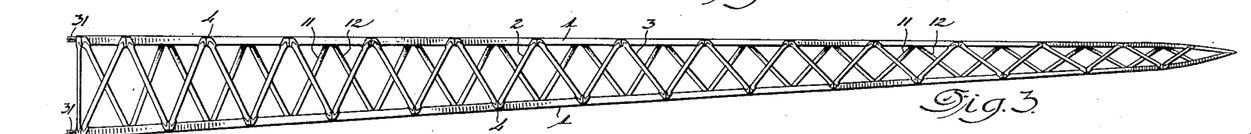
Fig. 3 is a side elevation of a spar for a tapered cantilever wing.
Figure 9:
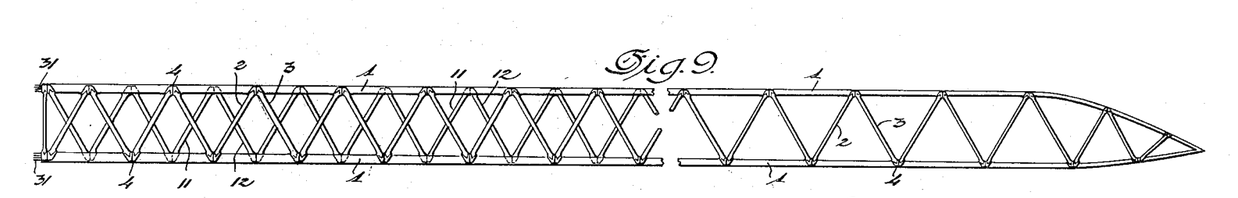
Fig. 9 is a side elevation of a spar for a cantilever wing of constant section from root to tip.
Figure 15:
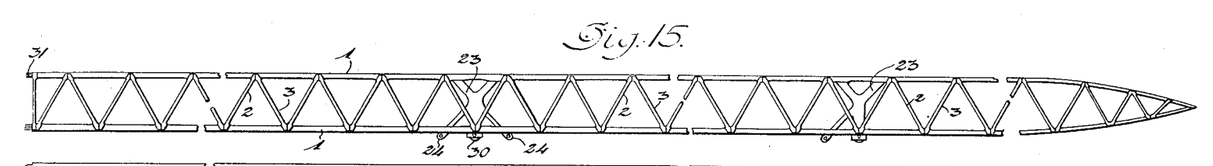
Fig. 15 is a side elevation of a spar for use in an externally braced wing having a constant section from root to tip.

The lattice web connecting the chord members is of steel tubing having the same chemical analysis as the chord members, all parts being preferably of high strength alloy steel so that heat treatment of the entire spar after assembly will relieve internal stresses uniformly. The spars are made up in the form of a double truss of the Warren (Figs. 1, 3, 9 and 15) and sub-divided Warren (Fig. 17) types of construction with the chord members acting as chords for both trusses and the two opposite trusses may be transversely parallel (Figs. 1 and 15) or staggered (Figs. 3 and 9) to reduce the unsupported panel lengths of the chords. The width of the flanges 5 of the chord members are proportioned to the angle and diameter of the web members 2 and 3 so that the longitudinal axes of these web members will intersect at the gravity axis of the chord members as indicated at 6 by the dotted lines in Fig. 11, thus obtaining practically fixed end column conditions at the panel points and avoiding eccentric loading.

Figures 10, 11, 12, 13, 14:
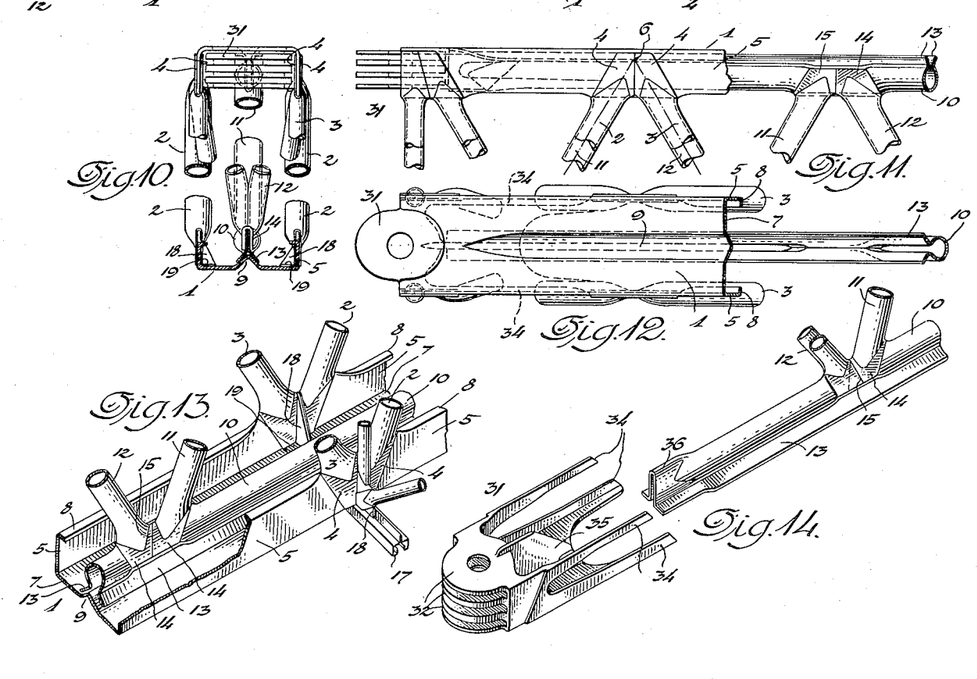
Fig. 10 is an enlarged detail showing partly in end elevation, with portions broken away, the structure shown in Fig. 9.
Fig. 11 is a side elevation of the upper portion of Fig. 10.
Fig. 12 is a plan view of Figs. 10 and 11.
Fig. 13 is a perspective detail of a fragment of the lower portion of the truss shown in Figs. 9 and 10.
Fig. 14 is a perspective view of a hinge member used with any of the various types of spars, together with a perspective detail of a portion of a reinforcing member used within the chord members of the spars.

The structure of each channeled chord member which is indicated as a whole by the numeral 1, is perhaps best shown in Fig. 13, in which the closed side or bottom wall 7 of the channel is formed with the integral flanges 5, the free edges of which flanges are preferably bent inward as indicated at 8 to provide additional rigidity. A corrugation 9 is formed in and extends along the longitudinal center of the closed side or bottom wall 7 of each channel chord member, the depth of this corrugation or bead 7 being of prime importance to the stiffness of the chords. When used in a cantilever wing having a constant section from root to tip, it may be necessary to reinforce the spars embodying these chords, and this is accomplished by providing an intermediate truss comprising chord members 10 and web members 11 and 12, the chord members 10 as illustrated in Fig. 13, having flanges 13 which are welded to the sides of the corrugation 9 on the inside of the channel chord members of the double truss. Each chord member 10 will be flattened at the points of attachment of the tubular web members 11 and 12 thereto, and the ends of these tubular web members are split to straddle the flattened parts of the chords 10 and flattened to lie thereagainst and are welded thereto, the meeting edges of these flattened end portions 14 being beveled as at 15 to correspond with the angle of these members 11 and 12 with relation to the chords, so that when a pair of web members are assembled in position upon the flattened portion of a chord member, these meeting edges 15 will form a joint at right angles to the chord, and the intersection of the longitudinal axes of the web members will lie substantially at the gravity axis of the channel chord member. The flattened end portions 4 of the web members 2 and 3 which lie flat upon the outer faces of the channel flanges 5 are similarly beveled to abut on a line at right angles to the channel chords.

Figures 17, 18, 19, 20, 21:
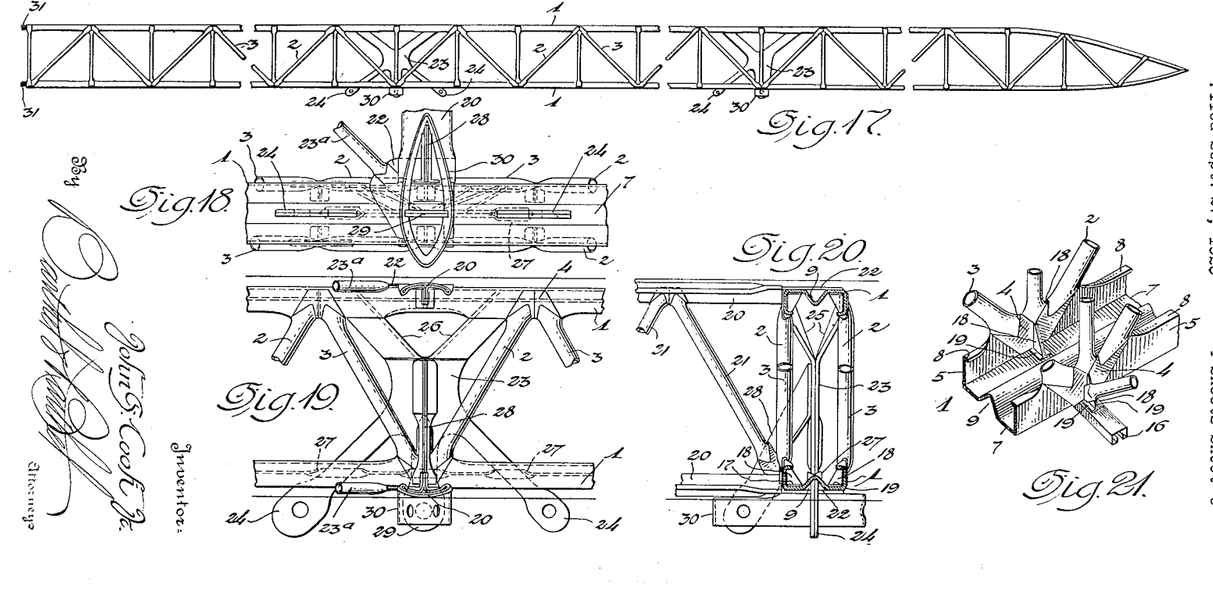
Fig. 17 is a side elevation of a sub-divided Warren truss construction of spar for an externally braced wing having a constant section from root to tip.
Fig. 18 is an enlarged detail showing in bottom plan view, that portion of the spar shown in Fig. 15, which is adjacent a point of attachment of an interplane strut thereto.
Fig. 19 is a side elevation of Fig. 18.
Fig. 20 is a sectional detail showing an end view of Fig. 19.
Fig. 21 is a perspective detail of a portion of the lower chord member of the spar shown in Fig. 17 and showing the manner in which tubular web members are secured to flanges of said chord member.

At the points of attachment of aerofoil ribs 16 (Fig. 21), compression ribs 17 (Fig. 13), or drag trussing, and interplane strut fittings, the web members 2 and 3 will be formed as illustrated in Fig. 13 with the two halves of the adjacent edge portions of the flattened ends 4 thereof bent outwardly at right angles to the channel flange 5 to which these flattened ends are welded, thus providing triangular shaped double brackets 18 with the abutting walls of the brackets welded together or to a part on the rib which they may embrace, and as shown in Fig. 21, the lower edges of the walls of these brackets may be turned laterally in opposite directions, forming bottom flanges 19 on said brackets, which flanges are welded to the bottom walls 7 within the channel chords or outside the chords to suitable plates 22 (Figs. 18–20) which are welded to the outside of the chords and extend laterally therefrom beneath the brackets with the chord members of compression trussing welded thereto and extending transversely from spar to spar to take the torsional stresses of the wing and compression stresses of drag trussing. This compression inter-spar trussing is of the single Warren truss type, and comprises the top and bottom chord members 20 and diagonal tubular web members 21 (Figs. 19 and 20).

The chord members 20 are each formed from a strip of comparatively thin gauge of metal bent into the form of a T-section of double thickness with the two edge portions of the metal forming the central longitudinal flange and the central portion of the strip folded upon itself and transversely of the flange with the edges of the transverse portion rolled with a small radius so that the inside diameter of the edge bead thus formed will be substantially equal to the thickness of the plates 22 to which the ends of these chord members are secured by flattening and splitting the end portions of the transverse double flange to embrace the plate and welding the divided parts to the opposite faces of the plate. The transverse flange is preferably curved transversely to prevent crinkling and buckling under compression stresses. The tubular web members 21 are flattened and split at their ends to embrace the vertical webs of the chord members 20 and are welded thereto in a manner similar to that described in connection with the formation of the spar webs, and these web members at the ends of the inter-spar trusses, in a like manner embrace and are welded to the triangular shaped brackets 18 on the outer sides of the spars.

The diagonal tubular tension members 23ª (Figs. 18, 19) of the double drag truss connecting the spars, are each preferably formed with flattened and split end portions to embrace the plates 22 to which they are welded in a manner similar to that in which the chord members 20 are secured thereto, these diagonal members of the drag truss being thus positioned in the horizontal plane of the gravity axes of the chords 20 which is at the maximum distance from the neutral axis. When this system of bracing is embodied in a wing structure, it will be a most effective provision against drag and torsional deflection and will make the spar and drag bracing, in effect, a rectangular tube.

Fittings for inter-plane struts are provided and these fittings are indicated as a whole by the numeral 23. These fittings are each made of three pieces of sheet metal and, with the exception of the incidence bracing member, they are symmetrical on the vertical axis of symmetry of the spar. In a spar of an upper wing, these fittings project through the wall 7 of the lower chord 1 at the longitudinal center thereof as illustrated in Figs. 18, 19, 20, 23, 24, and the parts which project through the chord, form eye plates 24 to which the inter-plane struts and wires are attached in any suitable manner. Two of the three sheet metal plates or blanks forming each fitting, are welded face to face to a point some distance above the gravity axis of the spar and are then spread apart laterally in Y-form in cross-section of the spar and the spread apart upper end portions 25 are welded to the side flanges 5 of the upper chord 1 of the spar, the eye plates 24 being in the form of arms extending radially downward through the lower chord from the gravity axis of the spar and the upper or divided part of the fitting may in some instances be also in the form of radial arms 26 in side elevation of the fitting, with these arms 26 extending radially upward from the gravity axis of the spar and in alignment with the downwardly extending arms forming the eye-plates 24. Where these eye-plates pass through the wall 7 of the chord 1, the metal of the wall is not cut away but is split and struck inwardly, and the flanges 27 thus formed, are welded to the sides of the eye-plates, thus retaining the full sectional area of the chord and providing a very rigid and strong attachment of the fitting to the spar. The third sheet metal plate or part of each fitting forms the incidence member thereof, and is in the form of an arm 28 providing an eye at its lower end for the attachment of the incidence wire thereto, said arm extending radially from the gravity axis of the spar and laterally thereof, with its lower end portion welded to the side of the lower chord and its upper end welded to the side of the other plates forming the fitting in such a manner that the lines of action will intersect at the gravity axis of the spar.

Figures 22, 23, 24, 25, 26, 27:
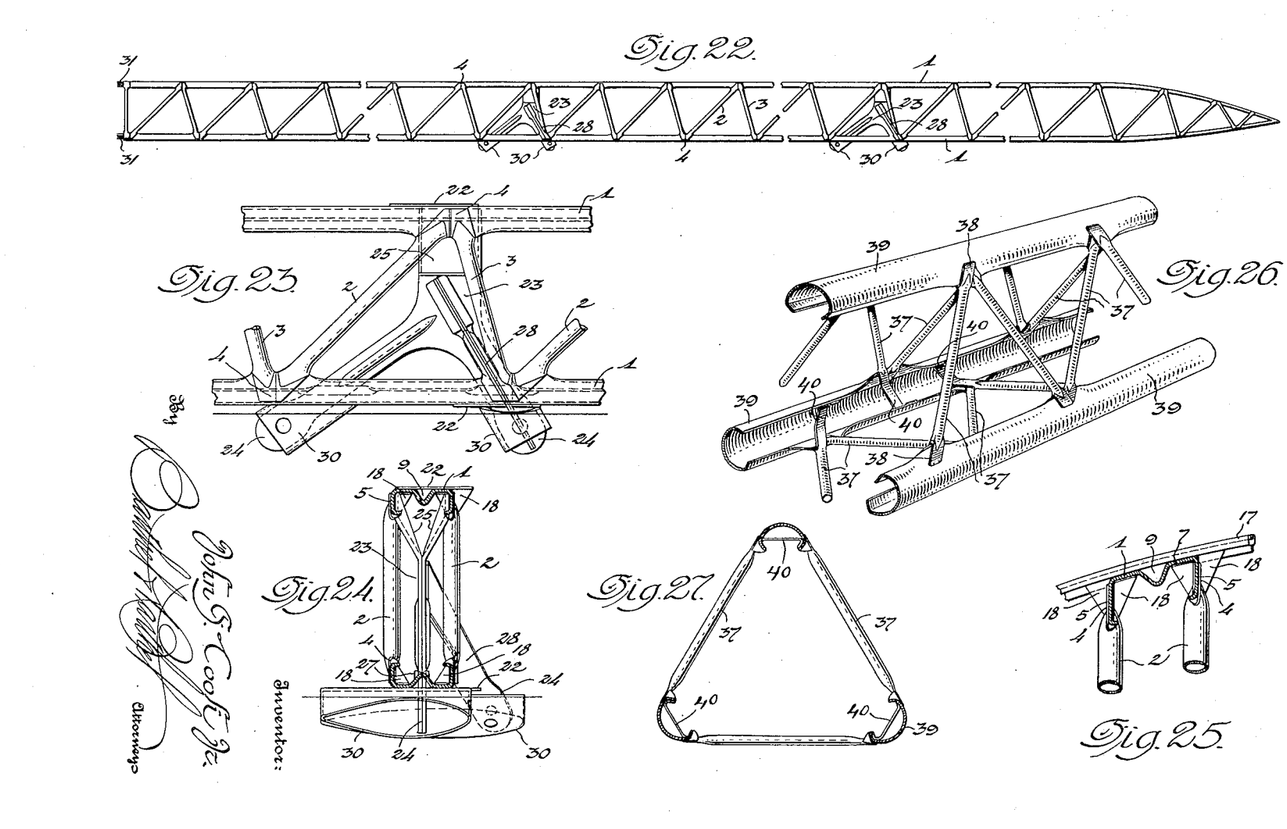
Fig. 22 is a side elevation of a spar for an externally braced wing of constant section from root to tip, the truss construction embodied therein being a modified form in which compression members are shorter than tension members to reduce the column length.
Fig. 23 is an enlarged detail showing in elevation a portion of the construction shown in Fig. 22.
Fig. 24 is an end elevation, partly in section of the structure shown in Fig. 23.
Fig. 25 is a sectional detail illustrative of spar structure in which the flanges of the chord member thereof are set at an angle to the bottom of its channel to conform to wing curvature.
Fig. 26 is a perspective detail illustrating a form of dirigible aircraft girder embodying features of the invention especially adapted for use in dirigible balloons or other aeronautic structures of the lighter than air type.
Fig. 27 is a transverse section of the girder shown in Fig. 26.

This system of construction is used in all inter-plane strut fittings, except as modified to suit the different inter-plane truss systems, as where it is applied to a spar truss, an arm 29 is formed on the same plates which form the arms 24 and intermediate said arms, to an eye in the lower end of which arm 29, an inter-plane strut may be secured, and where such strut is a stream-lined compression strut, a stream-lined socket 30 is welded to the lower side of the lower chord 1, with the eye of the arm 29 extending into said socket so that the strut will be firmly held by fitting into said socket and being secured to said arm. It will thus be seen that these fittings may be adapted to the Pratt wire system of bracing or the Warren strut system, and the latter may be modified as shown in Figs. 23 and 24, so that the compression struts are shorter than the tension struts to reduce the column length of the former, the angle of the arms 24 of the fitting being modified to conform to the angle of the struts, and, preferably, a socket 30 is provided for both the compression and tension struts.

This construction of inter-plane strut fittings is such that they do not interrupt the truss system of the spars, but form reinforcing members therefor, to distribute the stresses, and it will be noted that the lines of action of the lift wires, counter-lift wires, incidence wires, and struts all intersect at the gravity axis of the spars, due to the construction of these fittings, and thus eccentric loading is avoided. However, when found desirable, a certain fitting or fittings adjacent certain panels may be made so that the lines of action will be slightly eccentric to the gravity axis of the spar or spars, to cause a bending movement in one or more lift panels.

The attachment of the spars to the fuselage (not shown) or to other spars, is by means of a hinge member indicated as a whole by the numeral 31 and shown more particularly in detail in Fig. 14. These members are made in pairs which interlock, each member of the pair having a plurality of leaves or spaced ears 32 in staggered relation to the like ears on the other member of the hinge, so that the ears of one member of the pair will fit between the ears of the other member of the same pair to form an inter-locking joint. A central opening in all of the ears is provided to receive a pin or pintle 33 of sufficient length to pass through the hinge members at the ends of both the top and bottom chord members of each spar, there being a hinge member welded within the end of the channel of each chord, so that the ends of the chords will be in line with the hinge centers. Each hinge member is formed with integral fingers 34 to fit closely within the meeting angles of the bottom wall 7 and side flanges 5 of the spar chord channels and also into the meeting angles of the flanges 5 and inturned edge portions 8 thereof, these fingers being of a length to extend inwardly from the end of the channel chord to the first diagonal web members 2 and abut the flattened end portions 4 of these members where they are welded to the side flanges of the channel. Each hinge member is also formed with a central vertical web 35 extending longitudinally of the channel, and when the spar is provided with the center or auxiliary truss having chord members 10 welded in the bottoms of the channel chords, the end of each chord 10 is flattened as at 36 in Fig. 14, to embrace the web 35, and is welded thereto.

The depth of the corrugation 9 at the longitudinal center of each channel chord 1 is of prime importance to the stiffness of these chords, but this corrugation is tapered out to a flat surface near the root end of the spar, as this portion of the channel is reinforced by the web 35 and fingers 34 of the hinge member which extend inwardly from the end of the channel to the point of full depth of the corrugation 9. The stresses from the hinge pintle are thus distributed to all parts of the channel chord, and as the hinge members comprise a plurality of spaced ears through which the pintle extends, there are a number of points of shear on the pintle and the strength of the hinge joint is greatly increased. It will also be noted that each hinge member is secured within the end of its chord channel, with the plane of the end edge of the channel coinciding with the axis of the hinge pintle, or substantially so, and therefore when two spars are joined, end to end by interlocking the hinge members on one spar with those on the other, the ends of the spars are secured in abutting relation, providing a very strong rigid connection.

Figures 1, 2:
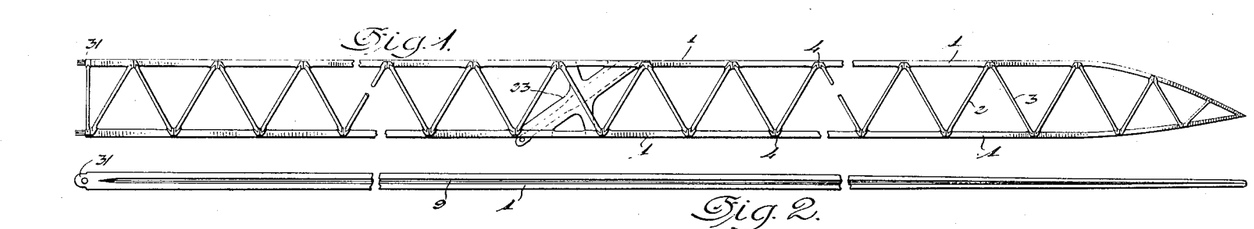
Figure 1 is a side elevation of a semi-cantilever spar for a wing of constant section from root to tip.
Fig. 2 is a plan view of the structure illustrated in Fig. 1.
Figures 4, 5, 6, 7, 8:
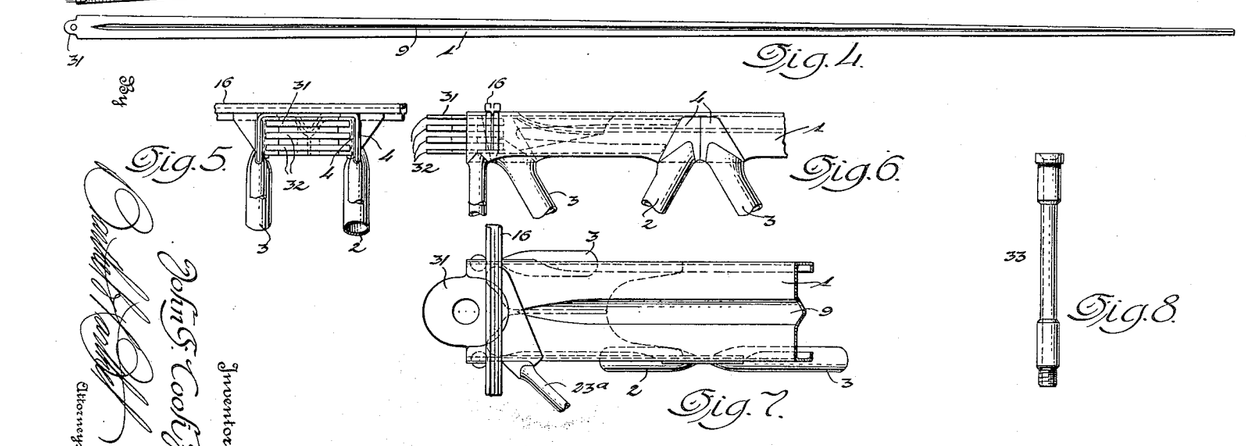
Fig. 4 is a plan view of the structure illustrated in Fig. 3.
Fig. 5 is an enlarged detail showing in end elevation, the upper portion of the spar shown in Fig. 3.
Fig. 6 is a side elevation of Fig. 5.
Fig. 7 is a plan view of Figs. 5 and 6.
Fig. 8 is an elevation of a hinge bolt used for the attachment of the spars to the fuselage or to other spars.
Figure 16:
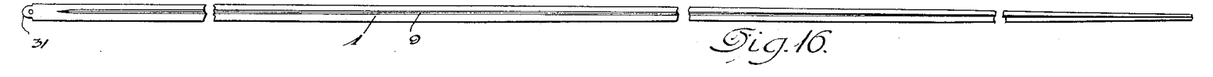
Fig. 16 is a plan view of the structure shown in Fig. 15.

When spars embodying the present invention are embodied in a tapered cantilever wing, it is preferable to taper the chord members 1 in width from root to tip as shown in Figs. 2, 4 and 16, and it is also preferable to reduce the lattice members 2 and 3 in diameter in steps, that is, in succeeding panels and the chord flanges 5 are also preferably reduced in width by steps to correspond to the lattice members. The lattice members of both trusses of the spar may be positioned opposite each other as shown in Figs. 1, 9, 15, 17 and 22, or they may be placed in staggered relation, as in Fig. 3. When embodied in a cantilever wing of constant section from root to tip, it is preferable in certain instances to reinforce the spars by an intermediate truss having chord and web members as shown in detail in Fig. 13, the chord members 10 being welded on the inside of the channel chords 1 to the corrugations 9 of said channels, with the web or lattice members 11 and 12 of the intermediate truss in staggered relation to the lattice members 2 and 3, and with the the intermediate truss tapered in strength from root to tip at a greater rate than the reduction in the main or double truss, thus providing a triple truss varying in strength according to the stresses imposed in the lift panel. In the second panel the chords are tapered in width and in width of flanges from the first strut to the first point of zero bending moment, and from this point to the second strut are of constant section. The web members are progressively reduced in diameter from the first strut to the first point of zero bending moment, and from that point to the second strut the diameter of the web members is constant but varied progressively in wall thickness. Each additional lift panel is reduced in weight and strength in a like manner to correspond with the variation in stresses in the various panels.

The present construction lends itself to the building of the wing structure in units with all the members of the spars, including those to which other units are to be attached, made of a high strength alloy steel of the same chemical analysis, so that each unit may be heat treated after assemblage as a unit, to relieve all internal stresses, and thus secure uniform physical properties, including the welds. The members provided on each unit for the attachment of other units thereto are so arranged that they project sufficiently from the unit to provide for the welding of other units thereto without injuriously affecting the heat treatment of the unit as the heat of spot welding is localized, and as these members to which other units are welded are, in most cases, located at points where the stresses are small, the strength of the structure as a whole is not reduced by the welding of the units together. Welds are most efficient in shear and as the welds of the present structure are, in most instances, located where one member embraces another, three thicknesses of metal are united by the weld, thus placing each weld in double shear, and the stresses are more evenly distributed due to the symmetrical joining of the parts. Most of the welds in the present construction are normalized in the heat treatment of each unit and will, therefore, have less deflection and be less affected by vibration than will be the rivets of a riveted construction.

By the utilization of the brackets 18 as means for attaching the wing ribs to the spars, which brackets are a part of the web members at their juncture points, and by proper spacing of said ribs and spar web members, there will be an intersection of web members at all ribs, providing a structure of maximum strength and minimum weight.

In Fig. 25 is illustrated the manner in which a channel chord member 1 of a double-truss spar may be formed to conform to the curvature of a rib 17 in a wing construction, and in Figs. 26 and 27 the application of features of the invention to the formation of a girder or the like for dirigible aircraft is shown wherein the lattice or web members 37, similar to the members 2 and 3 of the spar construction, are of tubular form with split and flattened end portions 38 to embrace the edges of open channel chord members 39 and spot welded thereto. The part of the flattened end portion 38 of certain of said members 37 which part is welded to the inner side of the flanges of the chords, is extended as at 40 to form brackets or braces extending across the open channels of the chords with the free ends of said brackets or braces welded to the opposite channel side or flange. Other applications of the features of the present invention to aircraft structures are contemplated, as are also modifications of the constructions as illustrated, and the terms employed are therefore to be construed broadly, within the limits of the appended claims.

What I claim is:—

1. In a truss, the combination with chord members, of a web connecting the chord members and comprising tubular web members arranged in angular relation to each other and having split and flattened end portions embracing and secured to the chord members with the longitudinal axes of adjacent web members intersecting at the gravity axes of the chord members.

2. In a truss, the combination with chord members, of a web connecting the chord members and formed of a plurality of angularly arranged tubular members with the end portions of said members split and flattened to embrace the chord members, the adjacent portions of the flattened ends of adjacent web members being bent at right angles to form angle brackets, with the walls of the brackets on adjacent web members in abutting relation and secured together.

3. In a truss, the combination with chord members, of a web connecting the chord members and formed of a plurality of tubular chord members with adjacent members arranged in angular relation, the end portions of the web members being split longitudinally and flattened to embrace portions of the chord members and secured thereto, an edge portion of each flattened end portion being turned at right angles to form an angle bracket integral with the end of its web member.

4. In a truss as characterized in claim 3 and wherein the walls of the angle brackets on the ends of adjacent web members are arranged in abutting relation and welded together to form a double wall bracket at the meeting ends of the web members with said ends of said members secured together by the welding of the bracket walls together.

5. In a truss as characterized in claim 3 and wherein the flattened end portions of adjacent and angularly disposed web members are formed with the adjacent edge portions of said flattened ends bent at right angles and extended in a plane bisecting the angle between said web members to provide a double wall angle bracket at the meeting ends of adjacent web members and integral therewith, the walls forming each angle bracket being bent laterally in opposite directions to provide flanges at the sides of the bracket.

6. In a truss as characterized in claim 3 and wherein angle brackets are formed integral with the ends of the web members, the combination therewith of tubular web members having flattened and split end portions embracing said brackets and welded thereto.

7. In a truss, the combination of chord members of channel shape in cross section, with the open sides of the channels facing each other, and a double web connecting said chord members, each web comprising a plurality of tubular web members having split and flattened end portions to embrace a side flange of the channel members and secured thereto with the two side flanges of the chord members lying in the plane of the longitudinal axes of the web members secured thereto.

8. In a truss, the combination of chord members of channel shape in cross section, with the open sides of the channels facing each other, and lattice webs connecting the channel members, connecting the side flanges of one channel member with the side flanges of the other channel member with the longitudinal axes of adjacent members of each web intersecting at the gravity axes of the chord members, whereby fixed end column condition is secured at panel points and eccentric loading of the truss is avoided.

9. In a truss, the combination of chord members of channel shape in cross section, with the open sides of the channels facing each other, a pair of webs secured to the side flanges of the channel chords and spaced apart thereby, and an intermediate truss extending longitudinally of and within said channel chords between the webs secured to the side flanges of said channel chords.

10. In a truss, the combination of chord members of channel shape in cross section, lattice webs connecting the side flanges of one channel chord with the side flanges of the other channel chord, chord members of an intermediate truss secured to the bottom walls of the channel chords within said channels and extending longitudinally thereof, and a lattice web connecting the chords within the channel chords and positioned between the lattice webs connecting the side flanges of the channel chords.

11. In a truss, the combination of main chord members each having side flanges and a bottom wall, with said bottom wall formed with a longitudinally extending hollow rib projecting into the channel of the chord, a double lattice web connecting the side flanges of the main chords with the members of each web secured to like side flanges of the chords, and an intermediate truss between said webs and comprising chord members secured within the channels of the main chords to the hollow ribs thereof and a lattice web connecting said chords within the main chords.

12. In a truss, the combination of main chord members of channel shape in cross section, lattice webs connecting the side flanges of one chord with the side flanges of the opposed chord, said webs comprising members arranged in angular relation to each other and embracing the chord flanges at their ends, with their longitudinal axes intersecting at the gravity axes of the chords, and an intermediate truss secured within the channels of said chords, said intermediate truss including a web formed of members arranged in angular relation with their longitudinal axes intersecting substantially at the gravity axes of the chords, the web members of the intermediate truss being arranged in staggered relation to the web members which are secured to the side flanges of the chord members.

13. In a truss, the combination of main chord members of channel shape in cross section, lattice webs connecting the side flanges of one chord with the side flanges of the opposed chord, said chords being positioned with their open sides facing each other and the bottom wall of each chord being formed with a longitudinal hollow rib projecting into the channel of the chord, and an intermediate truss between the lattice webs, each intermediate truss comprising hollow chord members formed with flanges welded to the sides of said ribs within the channel chords, and a web connecting said hollow chord members.

14. A truss structure as characterized in claim 13 and wherein the hollow chord members of the intermediate truss are flattened at the points of connection thereto of the members forming said intermediate web, said web members being of tubular form with split and flattened end portions to embrace the flattened portions of the chord members of the intermediate truss.

15. The combination with truss spars, of an inter-spar truss comprising chord members of T-form in cross-section and a web connecting said T-chords, said web comprising tubular members having flattened and split end portions to embrace the vertical flanges of the T-chords and welded thereto, said T-chords being formed from a strip of sheet metal folded longitudinally to provide a T-shape in cross-section, the edge portions of the metal being welded face to face to form the vertical flange of the T-chord and the control portion of the metal, folded upon itself to form the horizontal portion of the T-chord, said horizontal portion being curved transversely and formed with edge beads.

16. In a structure of the character described, the combination of truss spars having channel chords and webs connecting said channel chords, said webs comprising tubular members having flattened and split end portions to embrace the side flanges of the channel chords and said flattened end portions of adjacent members being bent at right angles and in abutting relation to provide angle brackets integral with the chord members, and inter-spar trussing including chord members secured at their ends to said brackets and a web connecting said inter-spar chords.

17. The combination of spars comprising channel chords with their open sides facing each other and double lattice webs connecting the side flanges of one chord with the side flanges of the other chord, the longitudinal axes of adjacent web members intersecting each other substantially at the gravity axis of each chord, inter-plane trusses connecting said spars and each including chord members secured to the channel chord members substantially in the plane of the gravity axis of said channel chords and web members connecting the chord members, and diagonal tension members secured at their ends to said inter-plane truss chords and channel chords adjacent the points of attachment of said inter-plane truss chords to said channel chords with their longitudinal axes in the plane of the gravity axes of said inter-plane and channel chords.

18. In combination with spars comprising chords and lattice webs connecting the chords, of inter-plane strut fittings secured within the spars between the webs thereof and each comprising a fitting having diverging portions secured at their ends to the chords adjacent the plane of attachment of the lattice webs thereto and a portion extending through the other chord of the spar midway between the planes of attachment of the webs thereto.

19. A structure as characterized in claim 18 and wherein each inter-plane strut fitting includes an arm extending laterally from the fitting and secured to the fitting at substantially the gravity axis of the spar.

20. The combination of a spar comprising channel shaped chord members and lattice web members secured to and connecting the side flanges of said channel chords and forming two webs extending longitudinally of each spar and spaced apart laterally of the spar, of inter-plane strut fittings for the spar secured thereto in the vertical longitudinal axis of symmetry of the spar, each fitting having an eye member extending through the closed side of one of the channel chord members of the spar midway between its side flanges, and each fitting including diverging arms secured at their ends to the side flanges of the other channel chord of the spar.

21. A structure as characterized in claim 20 and wherein the inter-plane strut fittings each include a pair of sheet metal members welded together to a point beyond the gravity axis of the spar and diverge to points of attachment with the side flanges of the adjacent channel chord with the welded together portion extending through the other channel chord of the spar at the longitudinal center thereof.

22. A structure as characterized in claim 20 and wherein the inter-plane strut fittings each include a pair of sheet metal members welded face to face throughout a portion of their length and formed with diverging upwardly extending arms with their upper ends secured to a channel chord member of the spar and also with downwardly diverging arms extending through the bottom wall of the other channel chord member at the longitudinal center thereof and also formed with an arm intermediate the downwardly diverging arm, said fitting also including an incidence arm of the fitting welded thereto at the gravity axis of the spar and extending laterally therefrom to a point beyond the transverse plane of the channel chord member through which the downwardly diverging arms extend.

23. An inter-plane strut fitting as characterized in claim 20 and including a streamlined socket secured to the channel chord member through which the intermediate downwardly extending arm extends with said projecting end of said arm extending into said socket.

24. The combination of spars each comprising a pair of channel chord members with the open sides of the channels facing each other, and lattice web members secured to and embracing the side flanges of said channel members and secured thereto, an inter-spar truss extending transversely between said spars, each inter-spar truss including chord members formed from a strip of sheet metal folded to form a T-shape in cross-section, a plate welded to the closed side of each channel chord of the spars, the ends of said inter-spar chord members being formed to embrace said plates and welded thereto, and each inter-spar truss also including tubular web members with ends formed to embrace the flanges of the T-shaped chords and welded thereto, said web members being arranged in angular relation with the formed ends of adjacent members abutting on a plane bisecting the angle between said members.

25. A spar comprising channel chord members tapered in width from root to tip, and lattice web members of tubular form with split and flattened end portions to embrace said side flanges of said chord members, and said channel chord members being each formed with a longitudinal hollow rib extending inwardly of each channel at the center of the closed side of each channel and tapering out toward the root end of the spar.

26. The combination with a spar including channel chord members and lattice web members connecting the side flanges of the channel chords, of an inter-plane strut fitting secured to the channel chord members in the plane of the longitudinal vertical axis of symmetry of the spar and formed with arms for the attachment thereto of lift wires, counterlift wires, incidence wires and struts with the lines of action of stresses thereon intersecting at the gravity axis of the spar.

27. In a truss, the combination with chord members, of a web connecting the chord members and including tubular members, each having a flattened end portion secured to a chord member and a portion integral with said flattened end portion and forming a brace.

28. In a truss, the combination with chord members, of a web connecting the chord members and including tubular members having split and flattened end portions to embrace portions of the chord members and secured thereto, said flattened end portions having parts integral therewith within the chord members and forming braces for said chord members and tubular members at the points of attachment of said tubular members to said chord members.

In testimony whereof I affix my signature in presence of two witnesses.

JOHN F. COOK, Jr.

Witnesses:
ANNA M. DORR,
LEWIS E. FLANDERS.